Patented May 29, 1945

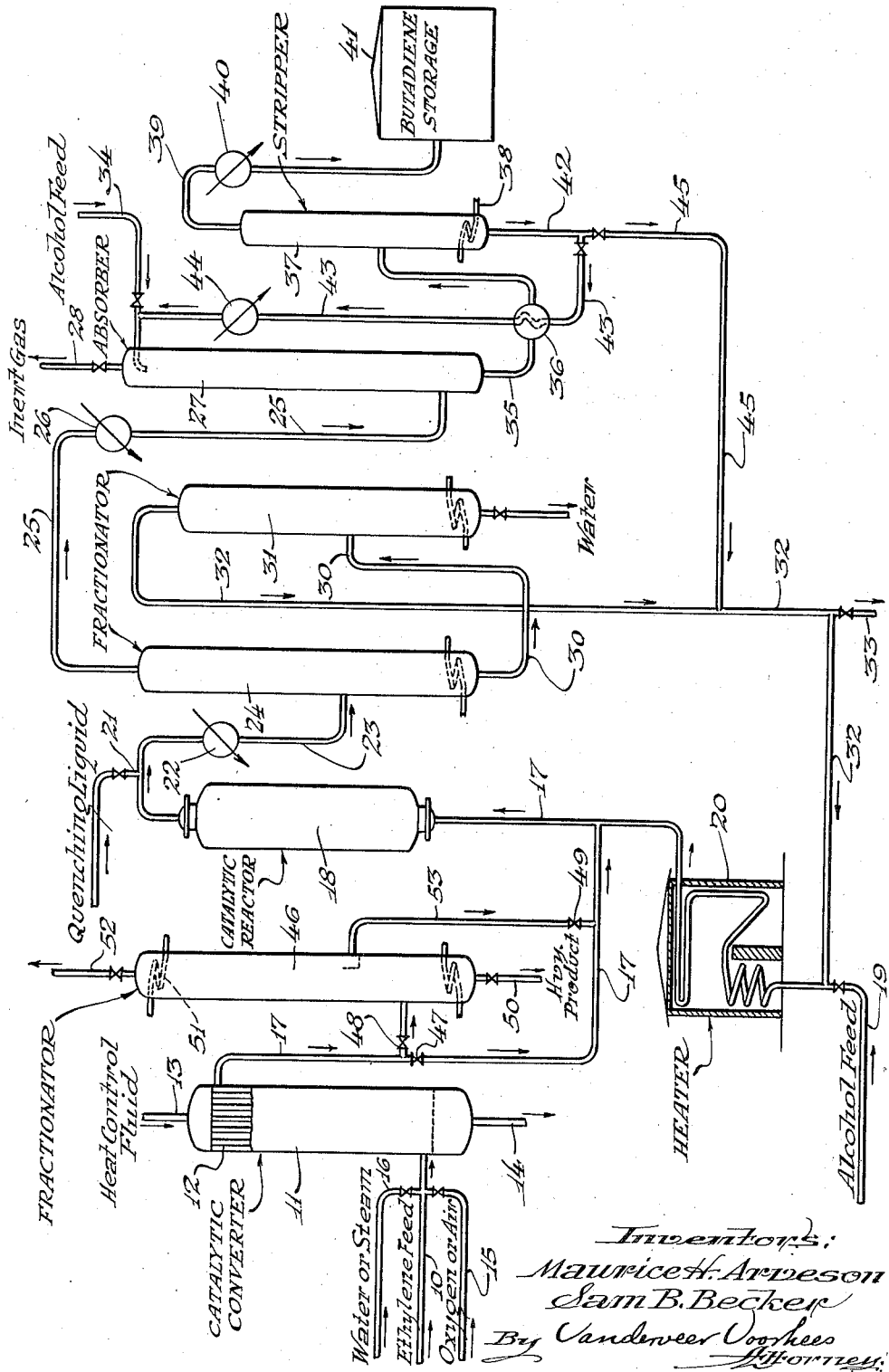

2,376,987

UNITED STATES PATENT OFFICE 2,376,987

PREPARATION OF BUTADIENE

Sam B. Becker, Chicago, and Maurice H. Arveson, Flossmoor, Ill., assignors to Standard Oil Company, Chicago, Ill., a corporation of Indiana Application May 30, 1942, Serial No. 445,120

9 Claims. (Cl. 260—681)

This invention relates to the manufacture of butadiene by a process of condensation from materials of lower molecular weight. The invention relates particularly to the manufacture of butadiene from alcohol and ethylene in a two-stage process giving a high conversion to butadiene in high concentration. One object of the invention is to effect a combination of ethylene and alcohol for the formation of butadiene without the use of expensive reagents. Another object of the invention is to prepare butadiene from ethylene and alcohol in a simple process involving only two reaction stages. The invention is illustrated by a drawing which shows diagrammatically an arrangement of apparatus for carrying out the process.

According to our process, ethylene is first subjected to a preliminary oxidation whereby oxidation products are produced which are subsequently reacted with alcohol in the presence of a catalyst having a dehydrating action, thereby eliminating the oxygen from the oxidized ethylene, principally as water. The initial oxidation of the ethylene is effected under controlled conditions in the presence of a catalyst selected to produce a substantial amount of ethylene oxide as one of the oxidation products.

Referring to the drawing, ethylene or gases containing ethylene are charged to the process by line 10 leading to converter 11. Ethylene employed for this purpose may be found in the gases obtained from petroleum oil conversion processes, cracking, reforming, etc. Such gases contain, in addition to the ethylene, appreciable amounts of ethane and small amounts of hydrogen, propane and propylene. These gases may be charged directly to the process without separation, although it is desirable that the gases be free from hydrogen sulfide and sulfur compounds.

Converter 11 contains an oxidizing catalyst which is preferably finely divided silver deposited on a carrier. Suitable carriers are pumice, asbestos, silica gel, kieselguhr, acid-treated clays, such as bentonite, montmorillonite, fuller's earth, etc., bauxite, alumina and the like. A very effective catalyst is made by impregnating silica gel with a solution of silver nitrate followed by drying and gently igniting in the presence of a reducing gas such as hydrogen. The silver catalyst may be promoted with various other metals such as copper, gold, cobalt, nickel, iron, chromium, molybdenum, vanadium, and manganese. Antimony, bismuth and certain other elements may also be employed as catalysts in converter 11.

It is important to control the temperature of the oxidation reaction in converter 11 within rather close limits, generally within the range of about 150 to 400° C. For this purpose the converter is constructed with an extensive internal heat exchange surface indicated by tubes 12 in the cut-away portion. A cooling or heating fluid is supplied to the exchanger tubes by connections 13 and 14. A suitable fluid for this purpose is water under pressure, oil, or molten metal or alloy, e. g., lead or lead bismuth allow. It is preferred to conduct the oxidation at superatmospheric pressure, for example, 100 to 500 pounds per square inch or as high as 800 pounds per square inch.

Oxygen required for the oxidation reaction in converter 11 is supplied under pressure by line 15 connected to a source of oxygen or air or other oxygen-containing gas. The amount of oxygen supplied is carefully controlled, usually within the range of about 0.1 to 1 mol of oxygen per mol of ethylene treated. An oxygen ratio of about 0.2 to 0.4 mol is generally satisfactory. Water or steam may also be supplied to the converter by line 16, either mixed with the ethylene feed gases as indicated or charged to the converter at a plurality of points in the path of the gases flowing therethrough. The introduction of water in this way may be employed to assist in controlling the temperature by absorbing the heat evolved in the reaction. Water in the reaction also tends to increase the production of ethylene oxide and reduce the formation of other oxidation products in the reaction.

From the converter 11 the gaseous oxidation products are conducted by line 17 to reactor 18 where the second stage of the process is effected. Ethyl alcohol introduced by line 19 or by other means hereinafter to be described, is heated in heater 20 and mixed with the oxidation products from 11. In reactor 18 a condensation is effected between the alcohol and the oxidation products by the action of a catalyst of the dehydrating type. Suitable catalysts are aluminum oxide, thorium oxide, zinc oxide, magnesium oxide, alumina deposited on silica gel, alumina gel and bauxite or mixtures of any of them. Small amounts of promoters such as vanadium, chromium and molybdenum may also be employed with these catalysts. Alumina gel prepared from the gelation and/or dehydration of an alumina sol is particularly effective.

The temperature of the reaction in 18 may be within the range of about 350 and 600° C., preferably about 400 to 500° C. Atmospheric pressure is satisfactory although reduced pressures and slightly increased pressures may be employed, for example within the range of about 0.2 to 4 atmospheres absolute. The amount of alcohol employed is preferably about 1 to 4 mols per atom of oxygen in the oxidation products from converter 11. The alcohol stream may be heated in heater 20 to a sufficiently high temperature above the reaction temperature to provide heat for the reaction in 18.

The charge to reactor 18 is introduced at a rate of the order of about 0.1 to 2 kilograms per liter of catalyst per hour, although this rate may be increased somewhat in the case of more active catalysts and operations at higher temperatures, charging rates of 3 to 5 kilograms per liter per hour being contemplated. The contact time between the reacting materials and the catalyst in 18 varies considerably with conditions of temperature and pressure, typical contact times being of the order of 1 to 20 seconds and more specifically about 5 to 10 seconds when operating at atmospheric pressure.

The gaseous products from 18 are cooled rapidly after removing from the reactor and this may be most easily accomplished by introducing a quenching liquid at 21. A tubular cooler or condenser 22 may also be employed. A suitable quenching liquid may be water, alcohol or a quenching oil. If water or oil are used, means must be provided for their subsequent separation from valuable reaction products.

From cooler 22 the reaction products are conducted by line 23 to fractionator 24 wherein the vapors containing butadiene are withdrawn by line 25 to condenser 26 and absorber 27. Vapor line 28 may be employed to conduct away from the absorber gaseous products unabsorbed in 27. Thus, in the case where air is supplied to the process at 15, nitrogen, ethylene, ethane, etc., ordinarily will be present in the gases leaving by line 28. In another modification of the process, to be described hereinafter, nitrogen and other fixed gases may be eliminated at an intervening point before charging oxidation products to reactor 18.

From the bottom of fractionator 24 there may be eliminated by line 30 a heavy fraction, for example the quenching oil or water supplied at 21, together with water produced in the reaction, alcohol, and other liquid products. This liquid mixture flows to refractionator 31 wherein it is further fractionated to recover alcohol and other liquids which may be recycled by line 32 to the heater 20 and thence to reactor 18. The amount of recycle alcohol may be regulated to control the temperature in the reactor. If desired, alcohol may also be withdrawn by line 33.

The absorbing liquid supplied to absorber 27 may be oil or an organic liquid such as acetone, phenol, glycerol, glycol, ethylene chlorhydrin and water solutions thereof, or other suitable absorbents for butadiene. The butadiene may also be recovered by absorption in cuprous chloride solutions if desired. We prefer, however, to employ alcohol for this purpose, either anhydrous alcohol or alcohol-water mixtures supplied by line 34. The enriched absorber liquid withdrawn at 35 passes through heat exchanger 36, thence to stripper 37 where heat, supplied by coil 38, drives off the butadiene product through vapor line 39 leading through condenser 40, thence to storage 41. Butadiene being normally a gas requires a moderate amount of refrigeration to effect liquefaction at atmospheric pressure. When operating at higher pressures, however, refrigeration may be dispensed with and ordinary cooling water employed in condenser 40.

The denuded absorber liquid is withdrawn from 37 by line 42 leading to exchanger 36 and thence by line 43 back to the absorber 27 through cooler 44. In the case where alcohol is employed as the absorbing liquid, it may be partly or entirely conducted by lines 45 and 32 to heater 20 where it is vaporized and heated to reaction temperature or above and charged to reactor 18 as hereinabove described. In this case the alcohol may carry with it, in solution, low boiling oxygen-containing compounds, particularly aldehydes and ethers which may have been carried over from fractionator 24 with butadiene vapor and absorbed with it in absorber 27.

In converter 11 and also in reactor 18, the catalyst may be regenerated by burning with air or oxygen, care being taken to control the temperature and prevent damage to the catalyst by overheating, a regeneration temperature of 1000 to 1200° F. being generally satisfactory in reactor 18. The oxidation catalyst in converter 11 requires less frequent regeneration, usually at lower temperature. The life of the catalyst in 18 may also be increased and the concentration of butadiene in the final products may be increased by subjecting the oxidation products from 11 to a preliminary fractionation before charging to the reactor 18. This may be done by diverting the stream in line 17 through fractionator 46 by closing valve 47 and opening valves 48 and 49. In fractionator 46 there is eliminated any heavy products, for example water, acids, and other products boiling above about 30° C. at atmospheric pressure, line 50 being provided for this purpose. A reflux coil 51 effects the condensation of ethylene oxide from nitrogen, $CO_2$, CO, ethane, ethylene, etc. which are discharged from the system by line 52. If concentrated oxygen is used, as the oxygen source, the ethylene in this stream may be concentrated and recycled to the process by scrubbing to remove $CO_2$, etc. The ethylene oxide and other light oxidation products forming a fraction boiling within the range of about 0 to 30° C. are withdrawn by valve 49 and line 53 and charged by line 17 to reactor 18 as hereinbefore described. When operating reactor 18 with the fractionated oxidation products in this manner, the recovery of butadiene from the process is considerably simplified.

In describing our process, we have made various simplifications, particularly in the drawing. It should be understood that these are not intended to be construed as limitations to the scope of the invention. Thus, we have described the use of granular catalysts in fixed beds. We may also use granular or powdered catalysts in moving beds or in suspension in the vapors undergoing treatment. Particularly in the first stage of the process, the oxidation reaction may be facilitated by employing the catalyst in powdered form and maintaining it in suspension by a suitable upflow of vapors in chamber 11 somewhat as described in U. S. Patent No. 2,373,008, issued April 3, 1945. The suspended catalyst reactor is especially suitable for highly exothermic reactions of the character described in converter 11. Our process is broadly defined by the following claims.

We claim:

1. The process of making butadiene which comprises subjecting ethylene to controlled oxidation with an oxygen-containing gas at about 150–400° C. in the presence of an oxidation catalyst, whereby ethylene oxide and other oxidation products of ethylene are produced and subsequently reacting ethyl alcohol with said oxidation products in the presence of a dehydrating catalyst at a temperature of about 350°–650° C. rapidly cooling the reaction products and recovering butadiene therefrom.

2. The process of claim 1 wherein the oxidation of ethylene is conducted in the presence of a silver catalyst.

3. The process of claim 1 wherein the said dehydrating catalyst is aluminum oxide.

4. The process of making butadiene which comprises oxidizing ethylene in the presence of a silver catalyst at a temperature within the range of about 150 to 400° C., recovering by fractionation from the oxidation products an oxygen-containing liquid boiling within the range of about 0 to 30° C., consisting substantially of ethylene oxide contacting said fraction and ethyl alcohol, for a period of about 1 to 20 seconds, with a dehydrating catalyst maintained at a temperature within the range of about 350 to 600° C., rapidly cooling the products of said reaction, separating butadiene and ethyl alcohol from said products and recycling said ethyl alcohol to said dehydrating catalyst.

5. The process of claim 4 wherein the dehydrating catalyst is aluminum oxide.

6. The process of preparing butadiene which comprises charging a feed stock comprising ethylene oxide and ethyl alcohol to a catalytic conversion zone maintained at about 350°–600° C. rapidly cooling and then, fractionating the reaction products into a plurality of fractions including a fraction comprising butadiene and a fraction comprising oxygenated hydrocarbons and recycling said oxygenated hydrocarbon fraction to the conversion zone.

7. The process of making butadiene comprising subjecting a mixture of ethylene oxide and ethyl alcohol to the action of a contact dehydrating catalyst at a temperature of about 350 to 650° C. and a rate of about 0.1 to 5 kilograms per liter of catalyst per hour, rapidly cooling the reaction products and recovering butadiene therefrom.

8. The process of claim 7 wherein oxygen-containing products of said reaction are recycled to the catalyst after removal of butadiene.

9. The process of claim 7 wherein the reaction is conducted at a temperature of about 350 to 475° C.

SAM B. BECKER.
MAURICE H. ARVESON.